United States Patent [19]

Shigemitsu et al.

[11] Patent Number: 4,764,555
[45] Date of Patent: Aug. 16, 1988

[54] THERMOPLASTIC RESIN COMPOSITION

[75] Inventors: Hideyuki Shigemitsu; Masafumi Hongo; Yutaka Toyooka, all of Ohtake, Japan

[73] Assignee: Mitsubishi Rayon Company Limited, Tokyo, Japan

[21] Appl. No.: 105,728

[22] Filed: Oct. 7, 1987

[30] Foreign Application Priority Data

Oct. 29, 1986 [JP] Japan ............................ 61-257708

[51] Int. Cl.$^4$ ............................................. C08L 69/00
[52] U.S. Cl. ...................................... 525/67; 525/69; 525/148
[58] Field of Search ........................... 525/67, 69, 148

[56] References Cited

U.S. PATENT DOCUMENTS 4,665,125 5/1987 Kishida et al. .................. 525/67

FOREIGN PATENT DOCUMENTS 051336 5/1982 European Pat. Off. .
108350 5/1984 European Pat. Off. .
1604656 2/1972 France .
1253226 11/1971 United Kingdom .

Primary Examiner—Theodore E. Pertilla
Attorney, Agent, or Firm—Oblon, Fisher, Spivak, McClelland & Maier

[57] ABSTRACT

A thermoplastic resin composition comprising:
(A) from 15 to 90 parts by weight of a polycarbonate resin;
(B) from 10 to 85 parts by weight of a multi-stage graft copolymer obtained by graft polymerizing from 2 to 50 parts by weight of an acrylate monomer (b) as a monomer for the first stage graft polymerization, in the presence of from 15 to 80 parts by weight of a rubbery polymer (a) of which at least 50% by weight is constituted by butadiene units and then graft polymerizing from 18 to 83 parts by weight of vinyl monomers (c) comprising from 25 to 85% by weight of an aromatic vinyl monomer (i), from 15 to 40% by weight of a vinyl cyanide monomer (ii) and from 0 to 35% by weight of another vinyl monomer (iii) copolymerizable with these monomers, as monomers for the second stage or subsequent graft polymerization, the total amount of the monomers (i) to (iii) being 100% by weight, and the total amount of components (a) to (c) being 100 parts by weight; and
(C) from 0 to 60 parts by weight of a polymer obtained by polymerizing at least one member selected from the group consisting of an aromatic vinyl monomer, a vinyl cyanide monomer and a methacrylate monomer;
the total amount of components (A), (B) and (C) being 100 parts by weight.

4 Claims, No Drawings

THERMOPLASTIC RESIN COMPOSITION

The present invention relates to a thermoplastic resin composition comprising a polycarbonate resin and a specific multi-stage graft copolymer as essential elements, which is capable of providing a molded product having excellent heat resistance, impact resistance, surface gloss and platability.

Rubber-modified thermoplastic resins represented by an ABS resin and high impact polystyrene are widely used as thermoplastic resin compositions having excellent impact resistance. Particularly, the ABS resin has excellent platability and thus constitutes the majority of the plating resins. However, the ABS resin lacks in heat resistance, and its use at a relatively high temperature at a level of higher than 90° C. has been restricted. Various proposals have been made to improve the heat resistance of the ABS resin. For instance, Japanese Examined Patent Publications No. 18194/1960 and No. 0373/1982 disclose that resin compositions having excellent heat resistance can be obtained by blending a copolymer of α-methylstyrene with acrylonitrile to the ABS resin.

Further, methods of blending polycarbonate resins to ABS resins are disclosed in Japanese Examined Patent Publications No. 15225/1963, No. 27579/1980, No. 21530/1982, No. 12300/1983 and No. 46269/1983 and Japanese Unexamined Patent Publications No. 40536/1982, No. 149938/1983 and No. 12047/1982.

However, in general, the impact strength tends to deteriorate when a copolymer of α-methylstyrene with acrylonitrile is blended to the ABS resin as mentioned above, and the resulting resin composition can not be used as the conventional ABS resin. Besides, the platability is inferior to the ABS resin. On the other hand, in the method for blending a polycarbonate resin to the ABS resin, there will be some problems in the surface gloss and platability of the shaped product although satisfactory results can be obtained with respect to the heat resistance and impact resistance. Namely, when such a blend of the ABS resin and the polycarbonate resin is molded to produce a relatively large shaped product or to produce a molded product for plating, it is necessary to set the molding temperature at a relatively high level. During such high temperature molding, the blend of the ABS resin and the polycarbonate resin tends to lead to agglomeration of the rubber-like polymer (rubbery polymer) which is a constituent of the ABS resin, due assumedly to the compatibility, and thus lead to a non-uniform structure. Thus, it brings about serious problems that the shaped products will have poor surface gloss or poor platability.

The present inventors have conducted extensive research to solve the above problems, and as a result, have found it possible to present a shaped product having excellent gloss and platability without agglomeration of the rubbery polymer even by high temperature molding and without deterioration in the heat resistance and impact resistance, by blending to a polycarbonate resin a multi-stage graft copolymer obtained by using an acrylate monomer as a monomer for the first stage graft polymerization in the presence of a butadiene rubber polymer and then graft polymerizing vinyl monomers comprising, as essential components, an aromatic vinyl monomer and a vinyl cyanide monomer, as monomers for the second stage or subsequent graft polymerization.

The present invention has been accomplished on the basis of this discovery.

The present invention provides a thermoplastic resin composition comprising:

(A) from 15 to 90 parts by weight of a polycarbonate resin;

(B) from 10 to 85 parts by weight of a multi-stage graft copolymer obtained by graft polymerizing from 2 to 50 parts by weight of an acrylate monomer (b) as a monomer for the first stage graft polymerization, in the presence of from 15 to 80 parts by weight of a rubbery polymer (a) of which at least 50% by weight is constituted by butadiene units and then graft polymerizing from 18 to 83 parts by weight of vinyl monomers (c) comprising from 25 to 85% by weight of an aromatic vinyl monomer (i), from 15 to 40% by weight of a vinyl cyanide monomer (ii) and from 0 to 35% by weight of another vinyl monomer (iii) copolymerizable with these monomers, as monomers for the second stage or subsequent graft polymerization, the total amount of the monomers (i) to (iii) being 100% by weight, and the total amount of components (a) to (c) being 100 parts by weight; and (C) from 0 to 60 parts by weight of a polymer obtained by polymerizing at least one member selected from the group consisting of an aromatic vinyl monomer, a vinyl cyanide monomer and a methacrylate monomer;

the total amount of components (A), (B) and (C) being 100 parts by weight.

Now, the present invention will be described in detail with reference to the preferred embodiments.

The polycarbonate resin (A) in the present invention is obtainable from a dihydroxydiarylalkane, and may be optionally branched. The polycarbonate resin may be prepared by a conventional method, and is usually prepared by reacting a dihydroxy or polyhydroxy compound with phosgene or a diester of carbonic acid. Suitable dihydroxydiarylalkanes include those having an alkyl group, a chlorine atom or a bromine atom at the ortho position relative to the hydroxy groups. Preferred specific dihydroxydiarylalkanes include 4,4'-dihydroxy-2,2-diphenylpropane (bisphenol A), tetramethylbisphenol A and bis-(4-hydroxyphenyl)-p-diisopropylbenzene. The branched polycarbonate may be prepared, for instance, by substituting a part, e.g. from 0.2 to 2 mol %, of the dihydroxy compound by a polyhydroxy compound. Specific polyhydroxy compounds include 1,4-bis-(4',4,2'-dihydroxytriphenylmethyl)benzene, phloroglucinol, 4,6-dimethyl-2,4,6-tri-(4-hydroxyphenyl)-heptene-2, 4,6-dimethyl-2,4,6-tri-(4-hydroxyphenyl)heptane 1,3,5-tri-(4-hydroxyphenyl)benzene, 1,1,1-tri(4-hydroxyphenyl)ethane and 2,2-bis-[4,4-(4,4'-dihydroxyphenyl)cyclohexyl]propane.

The above polycarbonate resins (A) may be used either alone or in combination as a mixture of two or more different kinds. The proportion of the polycarbonate resin (A) is from 15 to 90 parts by weight in 100 parts by weight of the total resin composition. If the proportion is less than 15 parts by weight, the impact resistance and heat resistance of a shaped product produced from the resulting resin composition will be inadequate, and if it exceeds 90 parts by weight, the moldability of the resulting resin composition and the platability of the shaped product produced therefrom will be poor.

The multi-stage graft copolymer (B) in the present invention is obtained by graft polymerizing from 2 to 50 parts by weight of an acrylate monomer (b) as a monomer for the first stage graft polymerization in the presence of from 15 to 80 parts by weight of a rubbery polymer (a) of which at least 50% by weight is constituted by butadiene units and then graft polymerizing from 18 to 83 parts by weight of vinyl monomers (c) comprising from 25 to 85% by weight of an aromatic vinyl monomer (i), from 15 to 40% by weight of a vinyl cyanide monomer (ii) and from 0 to 35% by weight of another vinyl monomer (iii) copolymerizable with these monomers, the total amount of the monomers (i) to (iii) being 100% by weight, and the total amount of components (a) to (c) being 100 parts by weight.

The rubbery polymer (a) includes polybutadiene and a butadiene-styrene copolymer or a butadiene-acrylonitrile copolymer having at least 50% by weight of butadidne units. These polymers may be used alone or in combination as a mixture of two or more. If the amount of the rubbery polymer in the multi-stage graft copolymer (B) is less than 15 parts by weight, a shaped product obtained from the resulting resin composition will be inferior in the impact strength, such being undesirable. On the other hand, if the amount exceeds 80 parts by weight, agglomeration of the rubbery polymer is likely to takes place, whereby the surface gloss and the platability of the shaped product tend to deteriorate.

The acrylate monomer used as a monomer for the first stage graft polymerization is an alkyl acrylate having an alkyl group of from 1 to 8 carbon atoms. Among them, ethyl acrylate and butyl acrylate are preferably employed. The graft polymerization of such an acrylate monomer is preferably conducted in the absence of a cross-linking agent. If the graft polymerization is conducted in the presence of a cross-linking agent, a shaped product produced from the resulting resin composition tends to have poor low temperature impact strength. If the amount of the acrylate monomer during the graft polymerization is less than 2 parts by weight, the resulting resin composition will have drawbacks such that when it is subjected to high temperature molding, the rubbery polymer tends to agglomerate, and the platability and/or surface gloss of a shaped product will be inadequate. On the other hand, if the amount exceeds 50 parts by weight, a shaped product produced from the resulting resin composition tends to be poor in the throwing power of plating and/or in the low temperature impact resistance, such being undesirable.

The aromatic vinyl monomer used as a monomer for the second stage or subsequent graft polymerization includes styrene, α-methylstyrene, o-methylstyrene, 1,3-dimethylstyrene, p-methylstyrene, t-butylstyrene, a halogenated styrene and p-ethylstyrene. These monomers may be used alone or in combination. If the amount of the aromatic vinyl monomer in the monomers for the second stage or subsequent graft polymerization is less than 25% by weight, substantial coloring occurs when the resulting resin composition is subjected to heat molding, and the impact resistance of a shaped product produced from the resulting resin composition tends to be poor, such being undesirable. On the other hand, if the amount exceeds 85% by weight, a shaped product produced from the resulting resin composition tends to be poor in the throwing power of plating.

The vinyl cyanide monomer used as a monomer for graft polymerization, includes acrylonitrile, methacrylonitrile, ethacrylonitrile and fumaronitrile. These monomers may be used alone or in combination. If the amount of the vinyl cyanide monomer is less than 15% by weight in the monomers for the second stage or subsequent graft polymerization, a shaped product produced from the resulting resin composition will be poor in the throwing power of plating. On the other hand, if the amount exceeds 40% by weight, substantial coloring will occur when the resulting resin composition is subjected to heat molding, and the impact resistance of a shaped product produced from such a resin composition will be poor, such being undesirable.

Another copolymerizable vinyl monomer used for the graft polymerization, includes methyl methacrylate, ethyl methacrylate and a maleimide monomer such as N-phenylmaleimide. However, the copolymerizable vinyl monomer is not restricted to such specific examples. Such a copolymerizable vinyl monomer is used in an amount of up to 35% by weight in the monomers for the second stage or subsequent graft polymerization, as the case requires.

In the multi-stage graft copolymer (B) in the present invention, it is particularly important that the acrylate monomer is graft polymerized in the first stage in the presence of a rubbery polymer, and the monomers for the second stage or subsequent graft polymerization may be graft polymerized at once or in separate stages.

The amount of the multi-stage graft copolymer (B) is from 10 to 85 parts by weight in 100 parts by weight of the thermoplastic resin composition of the present invention. If the amount is less than 10 parts by weight, the throwing power of plating of a shaped product obtained from the resulting resin composition as well as the adhesive strength of the plating layer, will be poor. On the other hand, if the amount exceeds 85 parts by weight, the shaped product tends to be poor in the heat resistance, such being undesirable.

The polymer (C) is obtained by polymerizing at least one member selected from the group consisting of an aromatic vinyl monomer, a vinyl cyanide monomer and a methacrylate monomer, and is incorporated in an amount of up to 60 parts by weight in 100 parts by weight of the thermoplastic resin composition of the present invention, as the case requires, in view of the balance of the moldability, the heat resistance, the impact resistance, etc.

The aromatic vinyl monomer and the vinyl cyanide monomer constituting the polymer (C) may be the same monomers as used for the multi-stage graft copolymer (B). There is no particular restriction as to the methacrylate monomer, but it is preferred to employ methyl methacrylate, ethyl methacrylate or propyl methacrylate. In addition to the above monomers, other copolymerizable monomers may be copolymerized up to 30% by weight for the polymer (C). As such a copolymerizable monomer, the above-mentioned acrylate monomer or maleimide monomer may be mentioned.

Various additives such as a flame retardant, a modifier, a releasing agent, a stabilizer against light or heat, a reinforcing filler, a dyestuff or a pigment, may suitably be added to the thermoplastic resin composition of the present invention, as the case requires.

For the preparation of the thermoplastic resin composition of the present invention, it is possible to use an apparatus which is commonly used for blending resins, such as a Henschel mixer or a tumbler. Likewise, for shaping, a conventional apparatus commonly used for the shaping such as a single screw extruder, a twin screw extruder or an injection machine may be employed.

Now, the present invention will be described in further detail with reference to Examples. However, it should be understood that the present invention is by no means restricted to these specific Examples.

In the Examples and Comparative Examples, "parts" and "%" mean "parts by weight" and "% by weight", respectively.

In the following Examples and Comparative Examples, the physical properties were determined in accordance with the following methods.

(1) Izod impact strength:
Measured in accordance with ASTM D-256.
(Unit: kg.cm/cm)
(Notched test piece having a thickness of ¼ inch was used)

(2) Rockwell hardness:
Measured in accordance with ASTM D-785.
(Unit: R-scale)

(3) Vicat softening temperature:
Measured in accordance with ISO-306 (Unit: ° C.) (4) Gloss:

A shaped product of 50 mm × 90 mm × 3 mm in thickness molded at a mold temperature of 60° C. under the maximum injection rate at a cylinder temperature of 290° C. (resin temperature of 305° C.), was measured at an angle of 60° by a gloss meter manufactured by K.K. Murakami Shikisai.

(5) Adhesive strength of the plated layer:
Onto a shaped product of 50 mm×90 mm×3 mm in thickness molded at a mold temperature of 60° C. under the minimum injection rate at a cylinder temperature of 290° C. (resin temperature of 305° C.), plating was applied under the following plating conditions to form a plated layer. Cut lines were engraved on the plated layer with a width of 2.5 cm, and the plated layer was pulled up vertically, whereupon the force required for peeling was calculated for a width of 1 cm.

Plating conditions

1. Etching ($CrO_3$ 400 g/liter, $H_2SO_4$; 20% by volume), treatment at 60° C. for 15 minutes
2. Acid treatment (HCl: 10% by volume), treatment at room temperature for 1 minute
3. Catalyzer ("Catalyst A-30", manufactured by Okuno Seiyaku Kogyo K.K.), dipping at 20° C. for 2 minutes
4. Accelerator ($H_2SO_4$: 10% by volume), dipping at 40° C. for 3 minutes
5. Electroless copper plating ("N-100", manufactured by Okuno Seiyaku Kogyo K.K.), dipping at 30° C. for 10 minutes
6. Electrolytic copper plating (copper sulfate: 200 g/liter, $H_2SO_4$: 50 g/liter, gloss agent ("Cupracid", manufactured by Schering Corp., 1 ml/liter), dipping at 20° C. for 60 minutes at a current density of 4 A/$dm^2$
7. Baking, treatment at 80° C. for 2 hours A sample treated in the above order wa left to cool for 1 hour and subjected to the measurement of the adhesive strength.

EXAMPLES 1 to 5 and COMPARATIVE EXAMPLES 1 to 5

(1) Preparation of a graft copolymer (B-1)

To 50 parts (as solid content) of polybutadiene latex having a solid content of 33% and an average particle size of 0.08 μm, 1 part (as solid content) of a copolymer latex comprising 85% of n-butyl acrylate units and 15% of methacrylic acid units and having an average particle size of 0.08 μm, was added under stirring, and the stirring was continued for 30 minutes to obtain an enlarged rubber latex having an average particle size of 0.28 μm.

The enlarged rubber latex thus obtained was put into a reactor, and 50 parts of distilled water, 2 parts of a wood rosin emulsifier, 0.2 part of Demol N (tradename, a naphthalenesulfonic acid-formalin condensation product, manufactured by Kao Corporation), 0.02 part of sodium hydroxide, 0.35 part of dextrose, 10 parts of ethyl acrylate and 0.1 part of cumene hydroperoxide were added thereto under stirring. The temperature was raised, and when the internal temperature reached 60° C., 0.05 part of ferrous sulfate, 0.2 part of sodium pyrophosphate and 0.03 part of sodium dithionite were added thereto. Then, the system was maintained at the internal temperature of 60° C. for 1 hour. After the 1 hour, a mixture comprising 12 parts of acrylonitrile, 14 parts of styrene, 14 parts of αc-methylstyrene, 0.2 part of cumene hydroperoxide and 0.5 part of tert-dodecylmercaptan was continuously dropwise added over a period of 90 minutes, and then the system was maintained for 1 hour and then cooled. The graft copolymer latex thus obtained was coagulated with dilute sulfuric acid, washed, filtered and dried to obtain a graft copolymer (B-1).

(2) preparation of a graft copolymer (B-2)

A graft copolymer (B-2) was prepared in the same manner as in the above graft copolymer (B-1) except that 70 parts (as solid content) of the polybutadiene latex as used in the preparation of the above graft copolymer (B-1) and the monomers for graft polymerization in the amounts as shown in Table 2 were used.

(3) Preparation of a graft copolymer (B-3)

In a reactor, 50 parts (as solid content) of polybutadiene latex having a solid content of 50% and an average particle size of 0.26 m, 100 parts of distilled water, 2 parts of a wood rosin emulsifier, 0.2 part of Demol N, 0.02 part of sodium hydroxide and 0.35 part of dextrose were introduced, stirred, mixed and heated to 60° C.. When the internal temperature reached 60° C., 0.05 part of ferrous sulfate and 0.2 part of sodium pyrophosphate were added thereto. Then, 8 parts of n-butyl acrylate and 0.1 part of cumene hydroperoxide were added under stirring, and the mixture was held for 1 hour. Then, a mixture comprising 12 parts of acrylonitrile, 30 parts of styrene, 0.03 part of sodium dithionite, 0.2 part of cumene hydroperoxide and 0.8 part of tert-dodecylmercaptan, was continuously dropwise added thereto over a period of 90 minutes, and the mixture was held for 1 hour and then cooled. The graft copolymer latex thereby obtained was coagulated with dilute sulfuric acid, then washed, filtered and dried to obtain a graft copolymer (B-3).

(4) Preparation of a graft copolymer (B-4)

Into a reactor, 50 parts (as solid content) of the enlarged rubber latex as used for the preparation of the above-mentioned graft copolymer (B-1), was added, and then 50 parts of distilled water, 2 parts of a wood rosin emulsifier, 0.02 part of sodium hydroxide and 0.35 part of dextrose were added thereto under stirring. Then, a mixture comprising 15 parts of acrylonitrile, 17.5 parts of styrene, 17.5 parts of α-methylstyrene, 0.2 part of cumene hydroperoxide and 0.5 part of tert-dodecylmercaptan, was continuously dropwise added thereto over a period of 90 minutes, and the system was maintained for 1 hour and then cooled. The graft copolymer latex thus obtained was coagulated with dilute sulfuric acid, then washed, filtered and dried to obtain a graft copolymer (B-4).

(5) preparation of a graft copolymer (B-5)

A graft copolymer (B-5) was prepared in the same manner as in the above graft copolymer (B-4) except that 60 parts (as solid content) of the polybutadiene latex as used in the preparation of the above graft copolymer (B-1) and the monomers for graft polymerization as identified in Table 2 were employed.

(6) Preparation of Polymers (C-1) to (C-3)

Polymers (C-1) to (C-3) having the compositions as shown in Table 1 were prepared by suspension polymerization.

The reduced viscosities $\eta sp/C$ of these polymers at °C. are also shown in Table 1. In Table 1, nsp/C is the value as measured in a 0.2% dimethylformamide solution in the case of polymer (C-1) and in a 1% chloroform solution in the case of polymers (C-2) and (C-3).

TABLE 1

|  | Composition |  | $\eta sp/C$ |
|---|---|---|---|
| Polymer (C-1) | Acrylonitrile | 29% | 0.62 |
|  | Styrene | 71% |  |
| Polymer (C-2) | Methyl methacrylate | 93% | 0.05 |
|  | Methyl acrylate | 7% |  |
| Polymer (C-3) | Methyl methacrylate | 55% | 0.07 |
|  | Styrene | 45% |  |

Graft copolymers (B-1) to (B-5) and polymers (C-1) to (C-3) thus obtained were mixed with a polycarbonate resin (A) "Novalex 7022" (tradename, manufactured by Mitsubishi Chemical Industries Limited) in the proportions as shown in Table 2, and the mixture was mixed for 5 minutes by a Henschel mixer, and then pelletized by a twin screw extruder having a screw diameter of 30 mm. By using the pellets thus obtained, various physical properties were evaluated in the above-mentioned manner. The results are also shown in Table 2.

TABLE 2

|  |  |  |  |  |  | Example 1 | Example 2 | Example 3 | Example 4 | Example 5 |
|---|---|---|---|---|---|---|---|---|---|---|
| Polycarbonate resin (A) (parts) |  |  |  |  |  | 60 | 75 | 60 | 60 | 40 |
| Graft copolymer (B) (parts) | B-1 | Polybutadiene 50 parts | Graft monomers 50 parts | 1st stage graft | EA 10 parts | 30 |  |  |  | 25 |
|  |  |  |  | 2nd stage graft | AN 12 parts, St 14 parts, α-MS 14 parts |  |  |  |  |  |
|  | B-2 | Polybutadiene 70 parts | Graft monomers 30 parts | 1st stage graft | EA 5 parts |  | 25 |  | 20 |  |
|  |  |  |  | 2nd stage graft | AN 7.5 parts, St 10 parts, α-MS 7.5 parts |  |  |  |  |  |
|  | B-3 | Polybutadiene 50 parts | Graft monomers 50 parts | 1st stage graft | EA 8 parts |  |  | 25 |  |  |
|  |  |  |  | 2nd stage graft | AN 12 parts, St 30 parts |  |  |  |  |  |
|  | B-4 | Polybutadiene 50 parts | Graft monomers 50 parts | AN 15 parts, St 17.5 parts, α-MS 17.5 parts |  |  |  |  |  |  |
|  | B-5 | Polybutadiene 60 parts | Graft monomers 40 parts | AN 12 parts, St 28 parts |  |  |  |  |  |  |
| Polymer (C) (parts) | C-1 |  |  |  |  | 10 |  |  |  | 35 |
|  | C-2 |  |  |  |  |  |  |  | 20 |  |
|  | C-3 |  |  |  |  |  |  | 15 |  |  |
| Physical properties | Izod impact strength (kg · cm/cm) |  |  |  |  | 52 | 62 | 42 | 43 | 40 |
|  | Rockwell hardness (R-scale) |  |  |  |  | 109 | 111 | 112 | 110 | 108 |
|  | Vicat softening temperature (°C.) |  |  |  |  | 126 | 138 | 128 | 127 | 115 |
|  | Gloss |  |  |  |  | 78 | 75 | 65 | 79 | 78 |
|  | Adhesive strength of plating (kg/cm) |  |  |  |  | 1.4 | 1.2 | 1.0 | 1.0 | 1.2 |
|  |  |  |  |  |  | Comparative Example 1 | Comparative Example 2 | Comparative Example 3 | Comparative Example 4 | Comparative Example 5 |
| Polycarbonate resin (A) (parts) |  |  |  |  |  | 60 | 70 | 45 | 60 | 10 |
| Graft copolymer (B) (parts) | B-1 | Polybutadiene 50 parts | Graft monomers 50 parts | 1st stage graft | EA 10 parts |  |  |  |  | 25 |
|  |  |  |  | 2nd stage graft | AN 12 parts, St 14 parts, α-MS 14 parts |  |  |  |  |  |
|  | B-2 | Polybutadiene 70 parts | Graft monomers 30 parts | 1st stage graft | EA 5 parts |  |  |  |  |  |
|  |  |  |  | 2nd stage graft | AN 7.5 parts, St 10 parts, α-MS 7.5 parts |  |  |  |  |  |
|  | B-3 | Polybutadiene 50 parts | Graft monomers 50 parts | 1st stage graft | EA 8 parts |  |  |  |  |  |
|  |  |  |  | 2nd stage graft | AN 12 parts, St 30 parts |  |  |  |  |  |
|  | B-4 | Polybutadiene 50 parts | Graft monomers 50 parts | AN 15 parts, St 17.5 parts, α-MS 17.5 parts | | 30 |  |  | 20 |  |
|  | B-5 | Polybutadiene 60 parts | Graft monomers 40 parts | AN 12 parts, St 28 parts |  |  | 25 | 30 |  |  |
| Polymer (C) (parts) | C-1 |  |  |  |  | 10 |  |  |  | 65 |
|  | C-2 |  |  |  |  |  | 5 |  | 20 |  |
|  | C-3 |  |  |  |  |  |  | 25 |  |  |
| Physical | Izod impact strength (kg · cm/cm) |  |  |  |  | 55 | 60 | 39 | 48 | 16 |

TABLE 2-continued

| properties | | | | | |
|---|---|---|---|---|---|
| Rockwell hardness (R-scale) | 108 | 110 | 107 | 108 | 110 |
| Vicat softening temperature (°C.) | 125 | 135 | 118 | 126 | 104 |
| Gloss | 45 | 42 | 50 | 39 | 55 |
| Adhesive strength of plating (kg/cm) | 0.6 | 0.3 | 0.7 | 0.5 | 0.8 |

Note:
EA: Ethylacrylate, AN: Acrylonitrile, St: Styrene, α-MS: α-methylstyrene, BA: n-butyl acrylate EXAMPLE 6 and COMPARATIVE EXAMPLES 6 and 7

In the same manner as in the preparation of the above graft copolymer (B-3), graft copolymers (B-6) and (B-7) having the compositions as shown in Table 3 were prepared. Graft copolymer (B-3) as used in Example 3 and graft copolymers (B-6) and (B-7) as prepared above were mixed with the polymer (C-1) as used in Example 1 and the polycarbonate resin (A) in the proportions as identified in Table 3, and the mixture was mixed for 5 minutes by a Henschel mixer, and then pelletized by a twin screw extruder having a screw diameter of 30 mm. By using the pellets thus obtained, various physical properties were evaluated in the above-mentioned manners. The results are also shown in Table 3.

TABLE 3

| | | | | | | Example 6 | Comparative Example 6 | Comparative Example 7 |
|---|---|---|---|---|---|---|---|---|
| Polycarbonate resin (A) (parts) | | | | | | 60 | 60 | 60 |
| Graft copolymer (B) (parts) | B-3 | Polybutadiene 50 parts | Graft monomers 50 parts | 1st stage graft | BA 8 parts | 25 | | |
| | | | | 2nd stage graft | AN 12 parts, St 30 parts | | | |
| | B-6 | Polybutadiene 15 parts | Graft monomers 85 parts | 1st stage graft | BA 55 parts | | 25 | |
| | | | | 2nd stage graft | AN 13 parts, St 17 parts | | | |
| | B-7 | Polybutadiene 50 parts | Graft monomers 50 parts | 1st stage graft | BA 10 parts | | | 25 |
| | | | | 2nd stage graft | AN 5 parts, St 35 parts | | | |
| Polymer (C) (parts) | C-1 | | | | | 15 | 15 | 15 |
| Physical properties | Izod impact strength (kg · cm/cm) | | | | | 48 | 40 | 50 |
| | Gloss | | | | | 65 | 80 | 70 |
| | Adhesive strength of plating (kg/cm) | | | | | 1.0 | 0.2 | No plating layer formed |

The thermoplastic resin composition of the present invention has the above described composition, and when it is molded even at a high temperature, a shaped product having excellent surface gloss can be obtained, and it has excellent platability, heat resistance and impact resistance. Thus, it is most suitable for use, for instance, as exterior and interior parts for automobiles.

We claim:

1. A thermoplastic resin composition comprising:
(A) from 15 to 90 parts by weight of a polycarbonate resin;
(B) from 10 to 85 parts by weight of a multi-stage graft copolymer obtained by graft polymerizing from 2 to 50 parts by weight of an acrylate monomer (b) as a monomer for the first stage graft polymerization, in the presence of from 15 to 80 parts by weight of a rubbery polymer (a) of which at least 50% by weight is constituted by butadiene units and then graft polymerizing from 18 to 83 parts by weight of vinyl monomers (c) comprising from 25 to 85% by weight of an aromatic vinyl monomer (i), from 15 to 40% by weight of a vinyl cyanide monomer (ii) and from 0 to 35% by weight of another vinyl monomer (iii) copolymerizable with these monomers, as monomers for the second stage or subsequent graft polymerization, the total amount of the monomers (i) to (iii) being 100% by weight, and the total amount of components (a) to (c) being 100 parts by weight; and
(C) from 0 to 60 parts by weight of a polymer obtained by polymerizing at least one member selected from the group consisting of an aromatic vinyl monomer, a vinyl cyanide monomer and a methacrylate monomer;
the total amount of components (A), (B) and (C) being 100 parts by weight.

2. The thermoplastic resin composition according to claim 1, wherein the acrylate monomer (b) is ethyl acrylate or butyl acrylate.

3. The thermoplastic resin composition according to claim 1, wherein the multi-stage graft copolymer is the one obtained by graft polymerizing the acrylate monomer (b) in the absence of a cross-linking agent.

4. The thermoplastic resin composition according to claim 2, wherein the multi-stage graft copolymer is the one obtained by graft polymerizing the acrylate monomer (b) in the absence of a cross-linking agent.

* * * * *